(12) United States Patent
Honda et al.

(10) Patent No.: US 6,922,768 B2
(45) Date of Patent: Jul. 26, 2005

(54) NON-VOLATILE STORAGE DEVICE AND CONTROL METHOD THEREOF

(75) Inventors: Toshiyuki Honda, Kyotanabe (JP); Tetsushi Kasahara, Katano (JP); Masayuki Toyama, Neyagawa (JP); Teruo Akashi, Osaka (JP); Keisuke Sakai, Takatsuki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 272 days.

(21) Appl. No.: 10/415,126

(22) PCT Filed: Aug. 16, 2002

(86) PCT No.: PCT/JP02/08332
§ 371 (c)(1),
(2), (4) Date: Apr. 24, 2003

(87) PCT Pub. No.: WO03/019382
PCT Pub. Date: Mar. 6, 2003

(65) Prior Publication Data
US 2004/0030823 A1 Feb. 12, 2004

(30) Foreign Application Priority Data
Aug. 24, 2001 (JP) ................................. 2001-254220

(51) Int. Cl.⁷ .............................................. G06F 12/00
(52) U.S. Cl. ........................................ 711/206; 711/220
(58) Field of Search .................................. 711/206, 220

(56) References Cited

U.S. PATENT DOCUMENTS

2004/0010618 A1 * 1/2004 Thomas ...................... 709/245

FOREIGN PATENT DOCUMENTS

| JP | 11-203191 A | 7/1999 |
| JP | 2000-57038 A | 2/2000 |
| JP | 2000-90004 A | 3/2000 |
| JP | 2002-508862 A | 3/2002 |
| WO | WO 98/44420 A1 | 10/1998 |
| WO | WO 99/44113 A2 | 9/1999 |

* cited by examiner

Primary Examiner—Reba I. Elmore
(74) Attorney, Agent, or Firm—Akin Gump Strauss Hauer & Feld, LLP

(57) ABSTRACT

To provide a nonvolatile storage device and control method thereof which improve convenience of portable devices by shortening initialization time. In generating a data validity table at initialization, a control part firstly reads out a validity flag and a second translation table. In the case where the validity flag is valid, logical blocks in the second translation table are valid. For that reason, the fourth table generation means can set all logical blocks in the second translation table as being valid, in the data validity table. In a single reading as mentioned above, the fourth table generation means can carry out setting with respect to a plurality of logical blocks. Further, with respect to a partial logical block which is set as being valid in the data validity table, it is possible to bypass reading out the data validity flag of the block and proceed to operation of next partial logical block.

8 Claims, 14 Drawing Sheets

FIG. 9

(rotated table, 6 ENTRY TABLE)

|  | PHYSICAL BLOCK 0 | PHYSICAL BLOCK 1 | PHYSICAL BLOCK 2 |
| --- | --- | --- | --- |
|  | 0 | 1 | 0 |
|  | 1 | 0 | 0 | 1 |
|  | 1 | 0 | 0 | 1 | 0 |
|  |   | 0 | 1 | 1 |
|  |   |   | 1 | 1 |
|  |   |   | 0 | 0 |

FIG. 10

| | PARTIAL LOGICAL BLOCK 1 | PARTIAL LOGICAL BLOCK 2 | | | | |
|---|---|---|---|---|---|---|
| PARTIAL LOGICAL BLOCK 0 | | | | | | |
| 0 | 1 | 0 | 1 | 1 | 1 | 1 |
| 0 | 0 | 1 | 0 | 0 | 1 | 0 |
| 1 | 0 | 0 | 1 | 0 | 0 | 0 |
| 1 | 1 | 0 | 0 | 0 | 0 | 0 |
| . | . | . | . | . | . | . |

5 DATA VALIDITY TABLE

NON-VOLATILE STORAGE DEVICE AND CONTROL METHOD THEREOF

CROSS-REFERENCE TO RELATED APPLICATION

This application is a Section 371 of International Application No. PCT/JP02/08332, filed Aug. 16, 2002, the disclosure of which is incorporated herein by reference.

TECHNICAL FIELD

The present invention relates to a nonvolatile storage device and control method thereof.

BACKGROUND ART

A storage device having a nonvolatile memory such as a flash memory, which is capable of rewriting data therein, has a high portability, and does not need backup by battery and the like, has been increasingly used as a storage device of portable devices handling music data and image data.

A prior art nonvolatile storage device having four 512-Mbit flash chips of 256 MB capacity will be explained with reference to FIG. 4 to FIG. 10.

FIG. 4 is a configuration view of the nonvolatile storage device.

In FIG. 4, 1 designates a nonvolatile storage device and 8 designates a data input/output device. The nonvolatile storage device 1 has nonvolatile storage mediums 2 (flash memories in a conventional embodiment and embodiments of the present invention) and a control part 3. The control part 3 further has a first translation table (an indirect address translation table) 4, a data validity table (a fourth table) 5, an entry table (a third table) 6 and an input/output control part 7.

The nonvolatile storage device 1 accepts various requests including write request, read request, clear request and so on from the data input/output device 8 through the input/output control part 7. The nonvolatile storage device 1 performs processings for the accepted various requests. In the case of the write request, data to be written is transferred from the data input/output device 8 to the nonvolatile storage device 1. In the case of the read request, data to be read out is transferred from the nonvolatile storage device 1 to the data input/output device 8. At the request accepted by the input/output control part 7, the control part 3 carries out writing, reading or clearing on the nonvolatile storage medium 2. The control part 3 also refers to and updates the first translation table 4, the data validity table 5 and the entry table 6.

FIG. 5 is a configuration view showing the nonvolatile storage medium 2 of the nonvolatile storage device 1.

In FIG. 5, 1-1, 1-2, ... 1-2048, 2-1, ... 8-2048 each designate a physical block. In the nonvolatile storage medium such as flash memory, data is cleared in the unit of physical blocks. The physical blocks 1-1, ... 1-2048 are collectively referred to as a first physical block group. The same applies to a second physical block group to an eighth physical block group. A single nonvolatile storage medium 2 (storage element) consists of eight physical block groups, each group having 2048 (=$2^{11}$) physical blocks, thereby containing 16,384 (=$2^{14}$) physical blocks in total.

Further, a single physical block set consists of eight physical blocks selected from each of eight block groups. For example, as shown in the drawing, 1-1, 2-2, 3-3, 4-3, 5-2, 6-2048, 7-1 and 8-3 are collectively referred to as a first physical block set.

It takes time to write data in the nonvolatile storage medium 2. Therefore, the control part 3 writes eight input data in a physical block set at a time. By simultaneously writing data in eight physical blocks (one physical block set), bit width of data becomes eight times greater so that writing speed of the nonvolatile storage device 1 can be improved eight times faster. However, in the nonvolatile storage device 1, it is impossible to simultaneously write data in plural physical blocks of one and the same physical block group. The technique for simultaneously writing data in plural physical blocks of the nonvolatile memory has become publicly known. For example, data sheet of the nonvolatile memory TC58512FT manufactured by Kabushiki Kaisha Toshiba provides an explanation of multi-block program for simultaneously writing data in plural physical blocks.

FIG. 6 is a configuration view showing the first physical block set of the nonvolatile storage medium in the nonvolatile storage device.

In FIG. 6, the physical block 1-1 consists of eight partial logical blocks including 1-1A, 1-1B, 1-1C, ... 1-1H. A single logical block is comprised of partial logical blocks that selected one by one in a sequential order, from all physical blocks included in the physical block set. For example, as shown in the drawing, 1-1A, 2-2A, 3-3A, 4-3A, 5-2A, 6-2048A, 7-1A and 8-3A are collectively referred to as a first logical block. One physical block and one logical block are each 32 pages, and one partial logical block is 4 pages.

FIG. 7 is a detail view showing a redundant area of the physical block of the nonvolatile storage medium in the nonvolatile storage device.

The partial logical block has a redundant area in addition to data. Each partial logical block of the first physical block group has a data validity flag in the redundant area. Some partial logical blocks of the first physical block group have a link table and a second translation table in the redundant area.

The second translation table is a table for translating logical addresses into physical addresses (physical addresses of partial logical blocks) of eight partial logical blocks included in the first physical block group. The link table is a table for physical addresses (physical addresses of partial logical blocks) of seven partial logical blocks (other than a partial logical block which is included in the first physical block group and has the link table) included in the second to eighth physical block groups. The validity flag is a flag for indicating whether the second translation table of the logical block is valid or invalid.

The second translation table may lie in the second to eighth physical block groups as well as the first physical block group.

A leading partial logical block of each physical block has first data capable of determining whether the physical block including the partial logical block has been cleared or not. Supposing that the first data is 8-bit data, when the data value is FFH, the physical block has been cleared, and when it is a value other than FFH, the physical block has not been cleared. The first data may be used for any purpose other than that of determining whether the physical block has been cleared or not.

Writing is performed in the unit of physical block sets and clearance is performed in the unit of physical blocks. Whether written data is valid or invalid can be determined in the unit of partial logical blocks.

FIG. 9 is a configuration view of the entry table 6.

In FIG. 9, numeral 0 or 1 represents the state of each physical block arranged in order of address 0, 1, 2, . . . . Numeral 0 indicates that writing has been completed and numeral 1 indicates that clearance has been completed. The entry table is prepared at initialization.

FIG. 10 is a configuration view of the data validity table 5.

In FIG. 10, numeral 0 or 1 represents validity of data written in each partial logical block of the first physical block group arranged in order of address 0, 1, 2, . . . . Numeral 0 indicates invalidity and numeral 1 indicates validity. Just like the entry table, the data validity table is prepared at initialization.

FIGS. 8A and 8B are flowcharts of operations of a third table generation means and a fourth table generation means at initialization of the conventional nonvolatile storage device. Part a of FIG. 8A is connected to part a of FIG. 8B.

In FIGS. 8A and 8B, at step 801, the third table generation means initializes all fields of the entry table by the default value 1 (cleared). At step 802, the fourth table generation means initializes all fields of the data validity table by the default value 0 (invalid). At step 803, the control part 3 initializes physical block number j in the physical block group by the default value 1. At step 804, the control part 3 initializes partial logical block number i in the physical block by the default value 1.

At step 805, the control part 3 reads . . . out the first partial logical block of the $j^{th}$ physical block in the first physical block group. At step 806, in accordance with the first data of a leading page of the physical block read out, the control part 3 determines whether the physical block is a cleared one or not. In the case of the cleared physical block, the entry table has been already initialized with the default value 1 (cleared) at the step 801 and the data validity table has been already initialized with the default value 0 (invalid) at the step 802. Therefore, the control part 3 completes processing of the $j^{th}$ physical block without doing anything. In the case where it is the written physical block, the operation proceeds to step 807 and the third table generation means writes 0 (written) in the field of the physical block of the entry table.

At step 809, the control part 3 determines whether the validity flag in redundant area is valid or not. In the case where the validity flag is invalid, the data validity table has been already initialized with the default value 0 (invalid) at the step 802, and therefore the control part 3 completes processing of the $i^{th}$ partial logical block without doing anything. In the case where the validity flag is valid, the operation proceeds to step 810 and the fourth table generation means writes 1 (valid) in the field of the partial logical block of the data validity table.

At step 811, the control part 3 adds 1 to the partial physical block number i in the physical block. At step 812, the control part 3 determines whether the partial logical block is a last one in the physical block or not, that is, i>8 or not. In the case where the partial logical block is not a last one, that is, i≦8, the operation returns to the step 808 and the control part 3 reads out the $i^{th}$ partial logical block of the $j^{th}$ physical block in the first physical block group and carries out processings at the steps 809 to 812 again. In the case where the partial logical block is a last one, that is, i>8 at the step 812, the control part 3 completes processing of the $j^{th}$ physical block and proceeds to processing of the next physical block.

At step 813, the control part 3 adds 1 to the physical block number j in the physical block group to 1. At step 814, the control part 3 determines whether the physical block is a last one in the physical block group or not, that is, j>2048 or not. In the case where the physical block is not a last one, that is, j≦2048, the operation returns to the step 804 and the control part 3 performs processing of the next physical block. In the case where the physical block is a last one, that is, j>2048, the control part 3 completes processing of the first physical block group and proceeds to processing of the second physical block group.

At step 815, the control part 3 initializes physical block group number k by the default value 2. At step 816, the control part 3 initializes physical block number j in the physical block group by the default value 1.

At step 817, the control part 3 reads out the first partial logical block of the $j^{th}$ physical block in the $k^{th}$ physical block group. At step 818, in accordance with the first data of a leading page of the physical block read out, the control part 3 determines whether the physical block is a cleared one or not. In the case of the cleared physical block, the entry table has been already initialized with the default value 1 (cleared) at the step 801 and therefore the control part 3 completes the processing of the $j^{th}$ physical block without doing anything. In the case where it is the written physical block, the operation proceeds to step 819 and the third table generation means writes 0 (written) in the field of the physical block of the entry table.

At step 820, the control part 3 adds 1 to the physical block number j in the physical block group. At step 821, the control part 3 determines whether the physical block is a last one in the physical block group or not, that is, j>2048 or not. In the case where the physical block is not a last one, that is, j≦2048, the operation returns to the step 817 and the control part 3 performs processing of the next physical block. In the case where the physical block is a last one, that is, j>2048, the control part 3 completes processing of the $k^{th}$ physical block group and proceeds to processing of the next physical block group.

At step 822, the control part 3 adds 1 to the physical block group number k to 1. At step 823, the control part 3 determines whether the physical block group is a last one or not, that is, k>8 or not. In the case where the physical block group is not a last one, that is, k≦8, the operation returns to the step 816 and the control part 3 carries out processing of the next physical block group. In the case where the physical block group is a last one, that is, k>8, this flowchart ends.

In this way, when the nonvolatile storage device is inserted into a main body, the nonvolatile storage device 1 generates an address control table including an address translation table for translating logical address designated by the main body into physical address of the nonvolatile storage device. Accordingly, time required for generating the address control table (hereinafter referred to as initialization time) increases in proportion to capacity of the nonvolatile memory.

In these days, the tendency has been toward an increase in information volume handled by portable devices, and in order to deal with the tendency, storage capacity of the nonvolatile storage device has also increased.

The increase in memory capacity, however, has caused an increase in initialization time. It is impossible to provide an external data access to the nonvolatile storage device having the nonvolatile memory during initialization time. In other words, the problem is that, after inserting the nonvolatile storage device into the portable device, time required to recognize the nonvolatile storage device by the portable device, that is, time during which the user cannot operate the portable device has increased.

The present invention solves the above-mentioned conventional problem and intends to provide a nonvolatile storage device and control method thereof which enable to improve convenience of portable devices by shortening initialization time.

DISCLOSURE OF INVENTION

In order to solve the above-mentioned problem, the present invention has a following configuration.

A nonvolatile storage device according to the present invention from one aspect comprises a plurality of physical blocks; a first table generation means for generating a first translation table to obtain physical addresses from logical addresses; a second table generation means for generating a second translation table to obtain physical addresses from logical addresses; and a third table generation means for generating a third table which indicates whether each of the above-mentioned physical blocks has been cleared or not, wherein the above-mentioned physical block has a data area which stores data therein and first data which indicates whether the above-mentioned physical block has been cleared or not, and the above-mentioned physical block designated by the physical address of the above-mentioned first translation table further has the above-mentioned second translation table, and the above-mentioned third table generation means reads out the above-mentioned first data and the above-mentioned second translation table from the above-mentioned physical block, decides a value of the above-mentioned third table of the above-mentioned physical block in accordance with the above-mentioned first data, determines that a value of the above-mentioned third table of the above-mentioned physical block corresponding to the physical address contained in the above-mentioned second translation table is the value indicating that the above-mentioned physical block has not been cleared, and does not read the above-mentioned first data with respect to the above-mentioned physical block which is contained in the above-mentioned second translation table and from which the above-mentioned first data has not been read out.

A nonvolatile storage device according to another aspect of the present invention comprises a plurality of physical blocks; a write means for dividing input data and writing the divided data in a plurality of the above-mentioned physical blocks or divided areas of the above-mentioned physical blocks; a link table generation means for generating a link table which is link information of a plurality of the above-mentioned physical blocks or the above-mentioned areas in which the divided input data is written respectively; and a third table generation means for generating a third table which indicates whether each of the above-mentioned physical blocks has been cleared or not, wherein the above-mentioned physical block has a data area which stores data therein and a first data which indicates whether the above-mentioned physical block has been cleared or not, and at least one above-mentioned physical block or one above-mentioned area among a plurality of the above-mentioned physical blocks or the above-mentioned areas in which divided input data is written respectively further has the above-mentioned link table, and the above-mentioned third table generation means reads out the above-mentioned first data and the above-mentioned link table from the above-mentioned physical block or the above-mentioned area, decides a value of the above-mentioned third table of the above-mentioned physical block in accordance with the above-mentioned first data, determines that a value of the above-mentioned third table of the above-mentioned physical block corresponding to the physical address contained in the above-mentioned link table is the value indicating that the above-mentioned physical block has not been cleared, and does not read the above-mentioned first data with respect to the above-mentioned physical block which is contained in the above-mentioned link table and from which the above-mentioned first data has not been read out.

A nonvolatile storage device according to another aspect of the present invention comprises a plurality of physical blocks; a first table generation means for generating a first translation table to obtain physical addresses from logical addresses; a second table generation means for generating a second translation table to obtain physical addresses from logical addresses; and a fourth table generation means for generating a fourth table which indicates whether valid data is written in each of the above-mentioned physical blocks or divided areas of the above-mentioned physical blocks or not, wherein the above-mentioned physical block or the above-mentioned area has a data area which stores data therein, and the above-mentioned physical block or the above-mentioned area designated by the physical address of the above-mentioned first translation table further has the above-mentioned second translation table and a second flag which indicates whether the above-mentioned second translation table is valid or not, and the above-mentioned fourth table generation means reads out the above-mentioned second flag and the above-mentioned second translation table from the above-mentioned physical block or the above-mentioned area, decides a value of the above-mentioned fourth table of the above-mentioned physical block or the above-mentioned area in accordance with the above-mentioned second flag, determines that a value of the above-mentioned fourth table of the above-mentioned physical block or the above-mentioned area corresponding to the physical address contained in the above-mentioned second translation table is the value indicating that valid data is written, and does not read the above-mentioned second flag with respect to the above-mentioned physical block or the above-mentioned area which is contained in the above-mentioned second translation table and from which the above-mentioned second flag has not been read out.

The above-mentioned nonvolatile storage device according to another aspect of the present invention, wherein the above-mentioned nonvolatile storage device comprises a plurality of bus lines and a plurality of nonvolatile storage elements which have a plurality of the above-mentioned physical blocks and are connected to the above-mentioned bus lines, and the number of the above-mentioned second translation table which is written in the above-mentioned nonvolatile storage elements connected to the above-mentioned bus lines is substantially same for each bus line.

The above-mentioned nonvolatile storage device according to another aspect of the present invention, wherein the above-mentioned nonvolatile storage device comprises a plurality of bus lines and a plurality of nonvolatile storage elements which have a plurality of the above-mentioned physical blocks and are connected to the above-mentioned bus lines, and the number of the above-mentioned link table which is written in the above-mentioned nonvolatile storage elements connected to the above-mentioned bus lines is substantially same for each bus line.

A control method of a nonvolatile storage device according to another aspect of the present invention is a control method of a nonvolatile storage device comprising: a plurality of physical blocks; a first table generation means for generating a first translation table to obtain physical addresses from logical addresses; a second table generation means for generating a second translation table to obtain physical addresses from logical addresses; and a third table generation means for generating a third table which indicates whether each of the above-mentioned physical blocks has been cleared or not, wherein the above-mentioned physical block has a data area which stores data therein and first data which indicates whether the above-mentioned physical block has been cleared or not, and the above-mentioned physical block designated by the physical address of the above-mentioned first translation table further has the above-mentioned second translation table, and the method having: a first decision step at which the above-mentioned third table generation means reads out the above-mentioned first data from the above-mentioned physical block and decides a value of the above-mentioned third table of the above-mentioned physical block in accordance with the above-mentioned first data; and a second decision step at which the above-mentioned third table generation means reads out the above-mentioned second translation table from the above-mentioned physical block and determines that a value of the above-mentioned third table of the above-mentioned physical block corresponding to the physical address contained in the above-mentioned second translation table is the value indicating that the above-mentioned physical block has not been cleared, wherein the above-mentioned third table generation means does not perform the above-mentioned first decision step with respect to the above-mentioned physical block which is contained in the above-mentioned second translation table and from which the above-mentioned first data has not been read out.

A control method of a nonvolatile storage device according to another aspect of the present invention is a control method of a nonvolatile storage device comprising: a plurality of physical blocks; a write means for dividing input data and writing the divided data in a plurality of the above-mentioned physical blocks or divided areas of the above-mentioned physical blocks; a link table generation means for generating a link table which is link information of a plurality of the above-mentioned physical blocks and the above-mentioned areas in which the divided input data is written respectively; and a third table generation means for generating a third table which indicates whether each of the above-mentioned physical blocks has been cleared or not, wherein the above-mentioned physical block has a data area which stores data therein and first data which indicates whether the above-mentioned physical block has been cleared or not, and at least one above-mentioned physical block or one above-mentioned area among a plurality of the above-mentioned physical blocks or the above-mentioned areas in which divided input data is written respectively further has the above-mentioned link table, and the method having: a first decision step at which the above-mentioned third table generation means reads out the above-mentioned first data from the above-mentioned physical block or the above-mentioned area and decides a value of the above-mentioned third table of the above-mentioned physical block in accordance with the above-mentioned first data; and a second decision step at which the above-mentioned third table generation means reads out the above-mentioned link table from the above-mentioned physical block or the above-mentioned area and determines that a value of the above-mentioned third table of the above-mentioned physical block corresponding to the physical address contained in the above-mentioned link table is the value indicating that the above-mentioned physical block has not been cleared, wherein the above-mentioned third table generation means does not perform the above-mentioned first decision step with respect to the above-mentioned physical block or the above-mentioned area which is contained in the above-mentioned link table and from which the above-mentioned first data has not been read out.

A control method of a nonvolatile storage device according to another aspect of the present invention is a control method of a nonvolatile storage device comprising: a plurality of physical blocks; a first table generation means for generating a first translation table to obtain physical addresses from logical addresses; a second table generation means for generating a second translation table to obtain physical addresses from logical addresses; and a fourth table generation means for generating a fourth table which indicates whether valid data is written in each of the above-mentioned physical blocks or divided areas of the above-mentioned physical blocks or not, wherein the above-mentioned physical block or the above-mentioned area has a data area which stores data therein, and the above-mentioned physical block or the above-mentioned area designated by the physical address of the above-mentioned first translation table further has the above-mentioned second translation table and a second flag which indicates whether the above-mentioned second translation table is valid or not, and the method having: a first decision step at which the above-mentioned fourth table generation means reads out the above-mentioned second flag from the above-mentioned physical block or the above-mentioned area, decides a value of the above-mentioned fourth table of the above-mentioned physical block or the above-mentioned area in accordance with the above-mentioned second flag; and a second decision step at which the above-mentioned fourth table generation means reads out the above-mentioned second translation table from the above-mentioned physical block or the above-mentioned area and determines that a value of the above-mentioned fourth table of the above-mentioned physical block or the above-mentioned area corresponding to the physical address contained in the above-mentioned second translation table is the value indicating that valid data is written, wherein the above-mentioned fourth table generation means does not perform the above-mentioned first decision step with respect to the above-mentioned physical block or the above-mentioned area which is contained in the above-mentioned second translation table and from which the above-mentioned second flag has not been read out.

According to the present invention, a high-speed and efficient control at initialization can be achieved.

The novel features of the invention are set forth with particularity in the appended claims. The invention as to both structure and content, and other objects and features thereof will best be understood from the detailed description when considered in connection with the accompanying drawings.

BRIEF DESCRIPTION OF DRAWINGS

FIG. 9 is a configuration view of an entry table.

FIG. 10 is a configuration view of a data validity table.

Part or All of the drawings are drawn schematically for diagrammatic representation and it should be considered that they do not necessarily reflect relative size and position of components shown therein.

BEST MODE FOR CARRYING OUT THE INVENTION

Hereinafter, embodiments that embody best mode for carrying out the present invention will be described with reference to the drawings.

<<Embodiment 1>>

Figure 4:
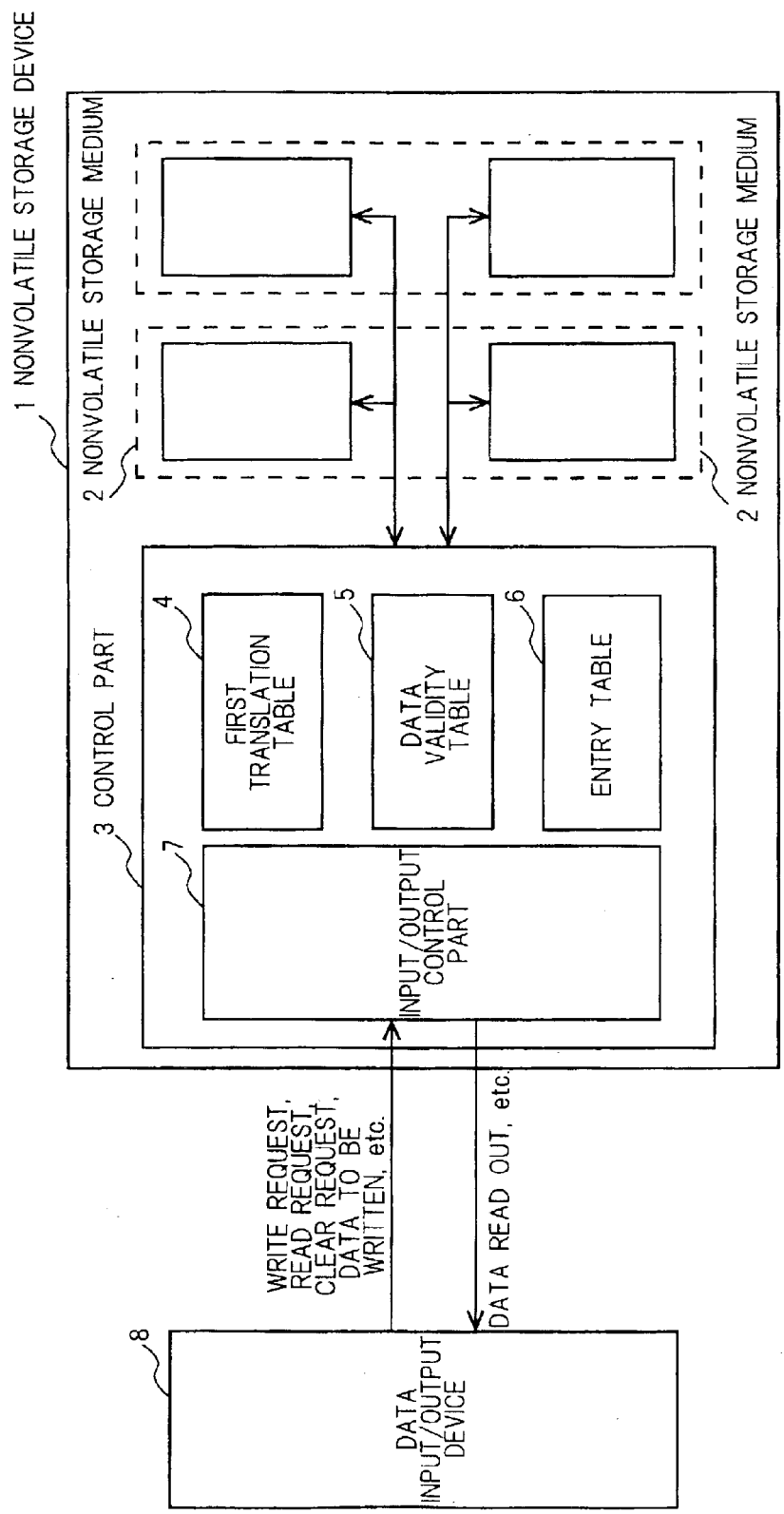
FIG. 4 is a configuration view of the nonvolatile storage device.
Figure 5:
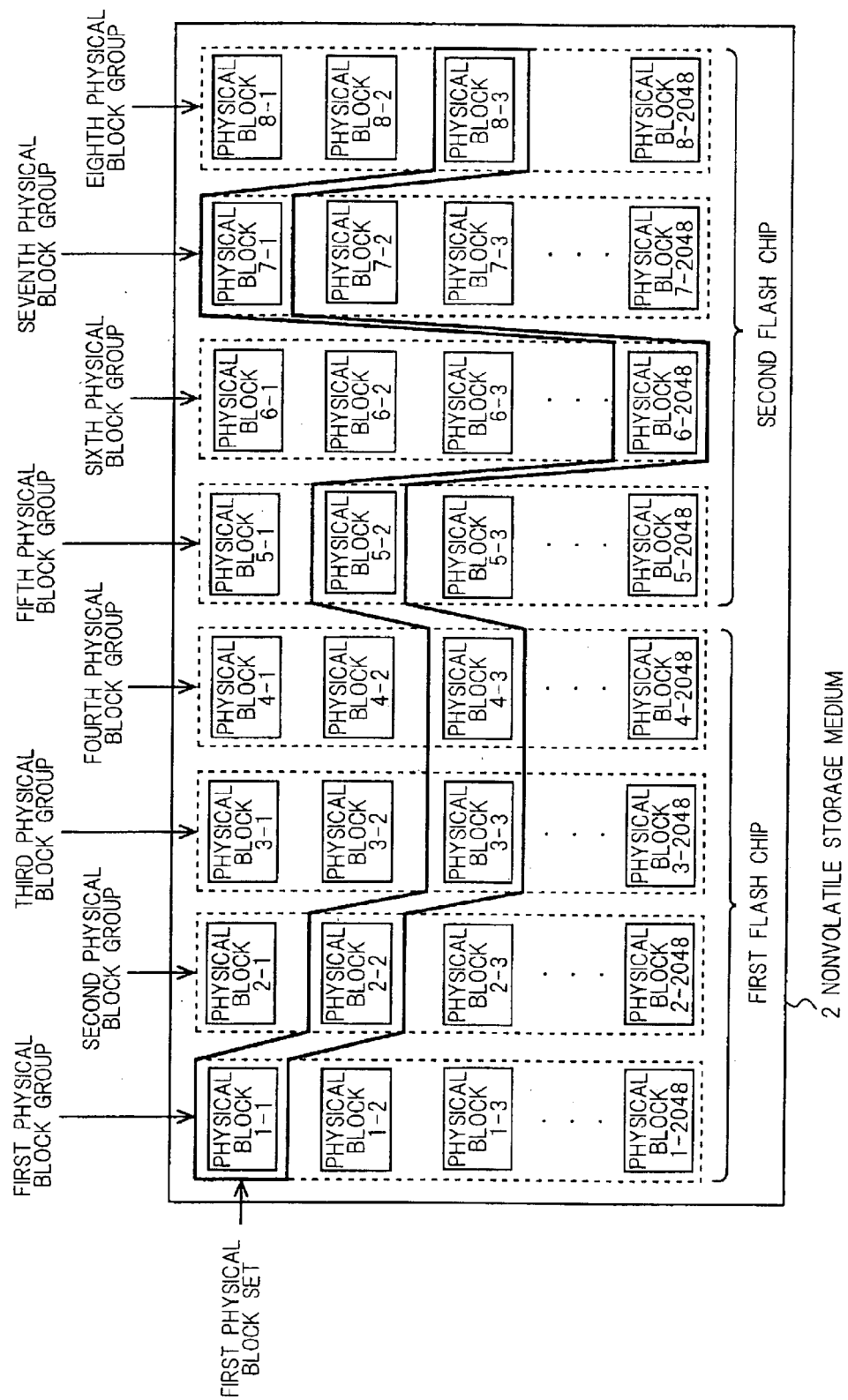
FIG. 5 is a configuration view showing the nonvolatile storage medium in the nonvolatile storage device.
Figure 6:
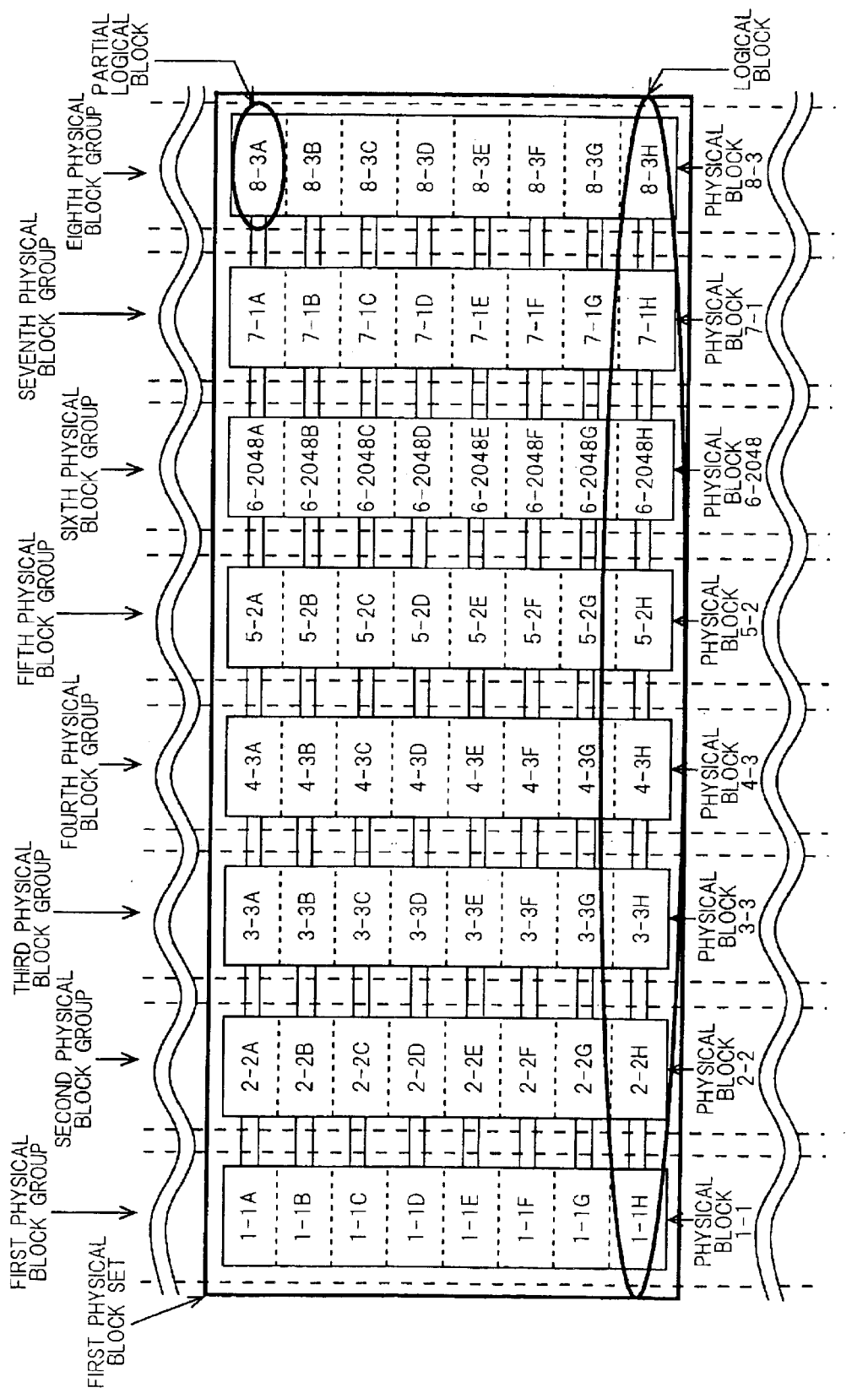
FIG. 6 is a configuration view showing a first physical block set of the nonvolatile storage medium in the nonvolatile storage device.
Figure 7:
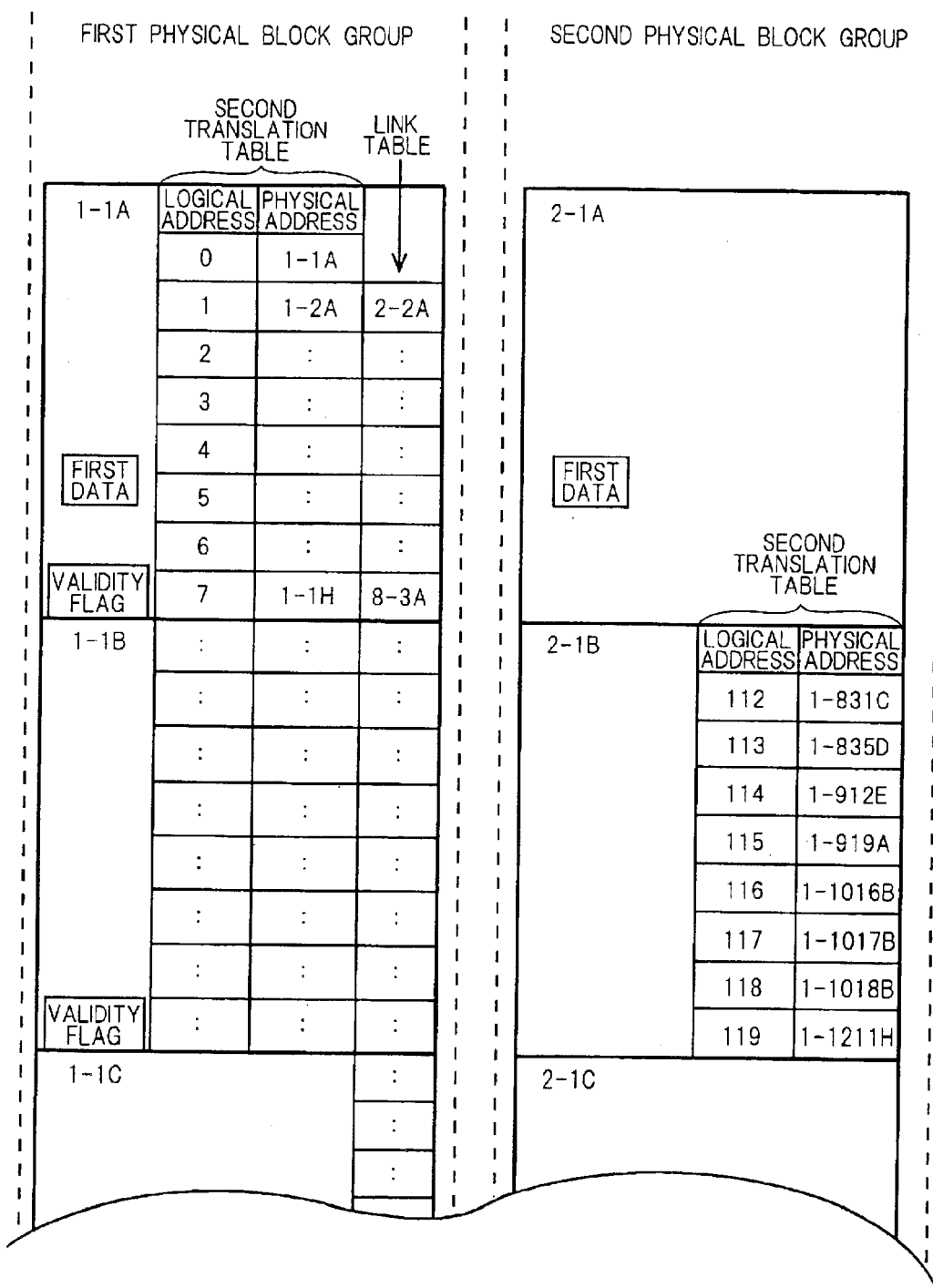
FIG. 7 is a detail view showing a redundant area of a physical block of the nonvolatile storage medium in the nonvolatile storage device.
Figure 8A:
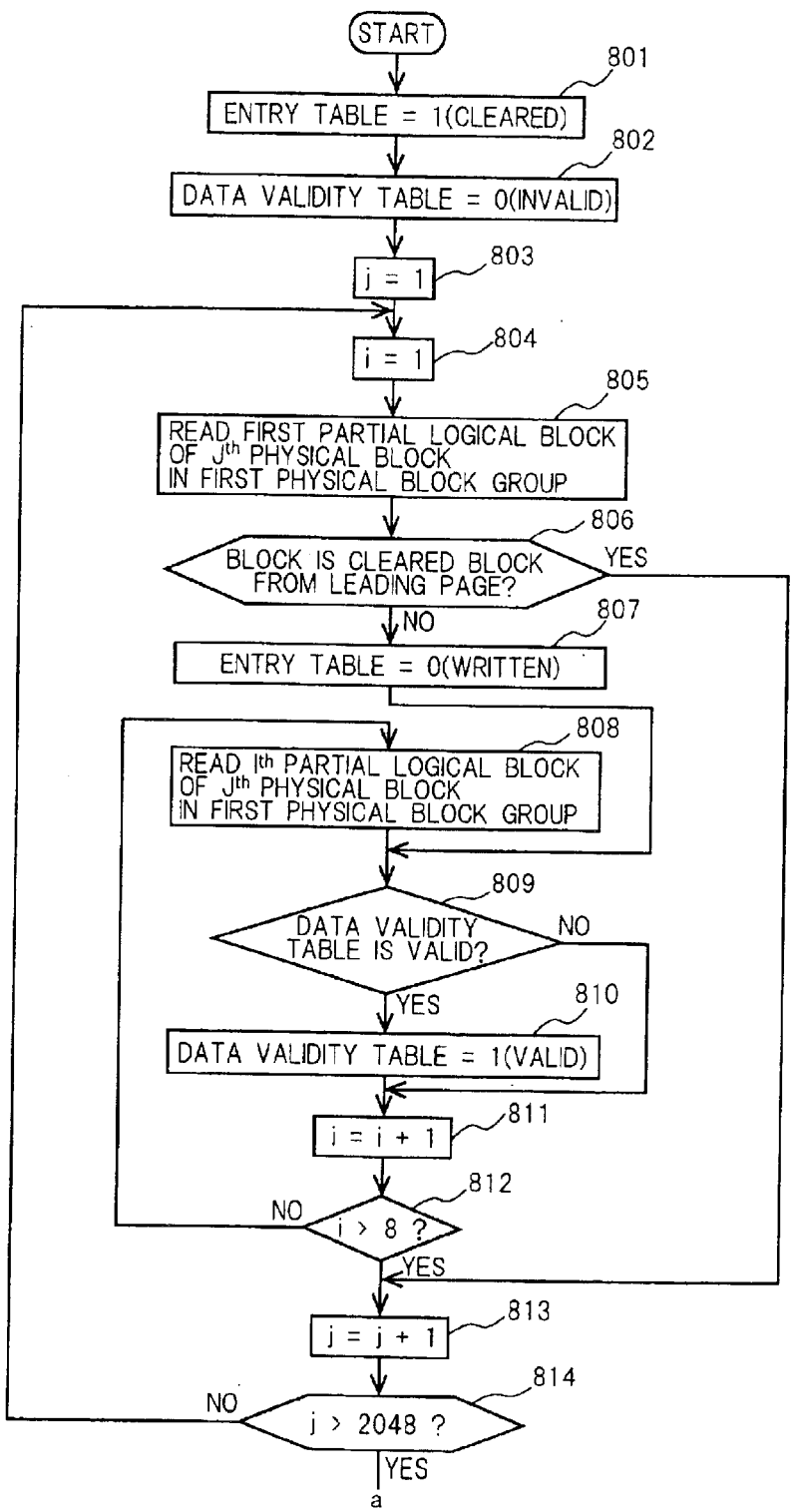
FIG. 8A is a flowchart part 1 of operations of the third table generation means and the fourth table generation means at initialization of the conventional nonvolatile storage device.
Figure 8B:
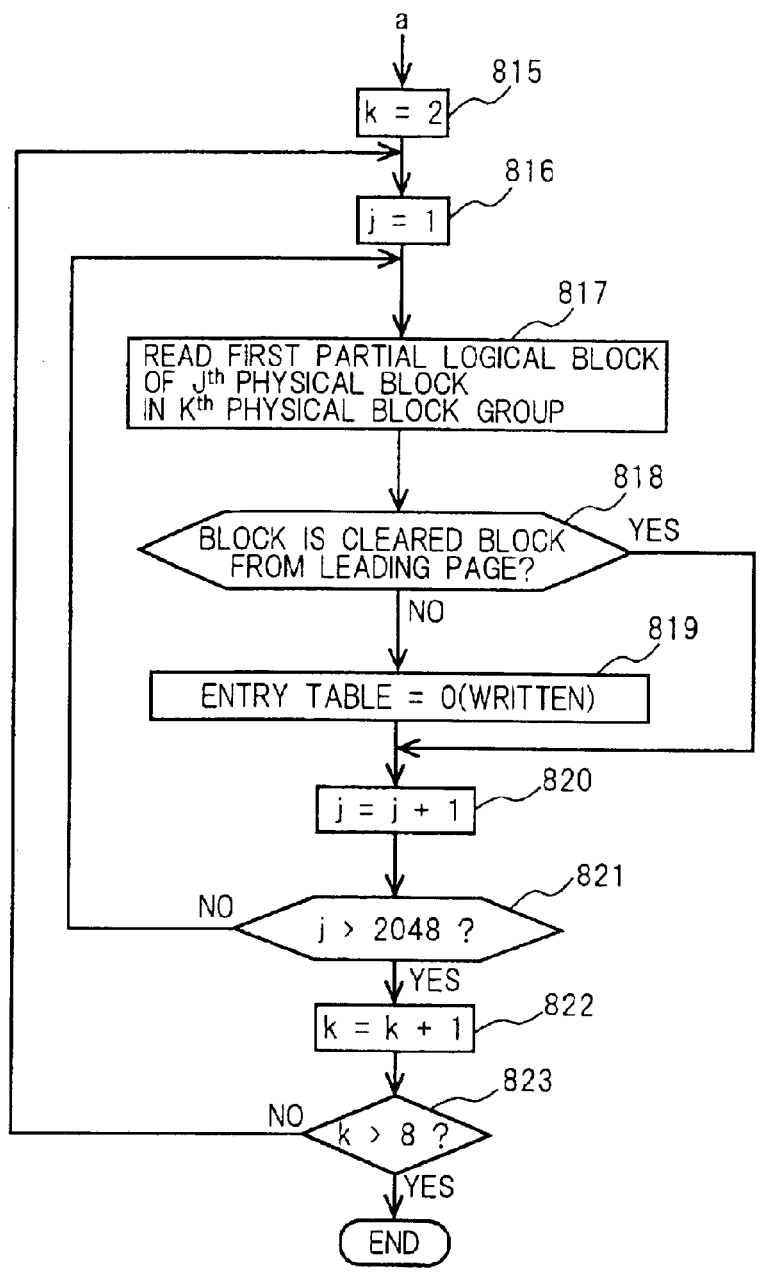
FIG. 8B is a flowchart part 2 of operations of the third table generation means and the fourth table generation means at initialization of the conventional nonvolatile storage device.

A nonvolatile storage device of Embodiment 1 according to the present invention has a configuration as shown in FIG. 4. A control part 3 of the nonvolatile storage device of Embodiment 1 comprises a first table generation means for generating a first translation table 4, a second table generation means for generating a second translation table in a partial logical block of a nonvolatile storage medium 2, a third table generation means for generating an entry table (a third table) 6 and a fourth table generation means for generating a data validity table (a fourth table) 5 (not shown in FIG. 4).

Figure 1A:
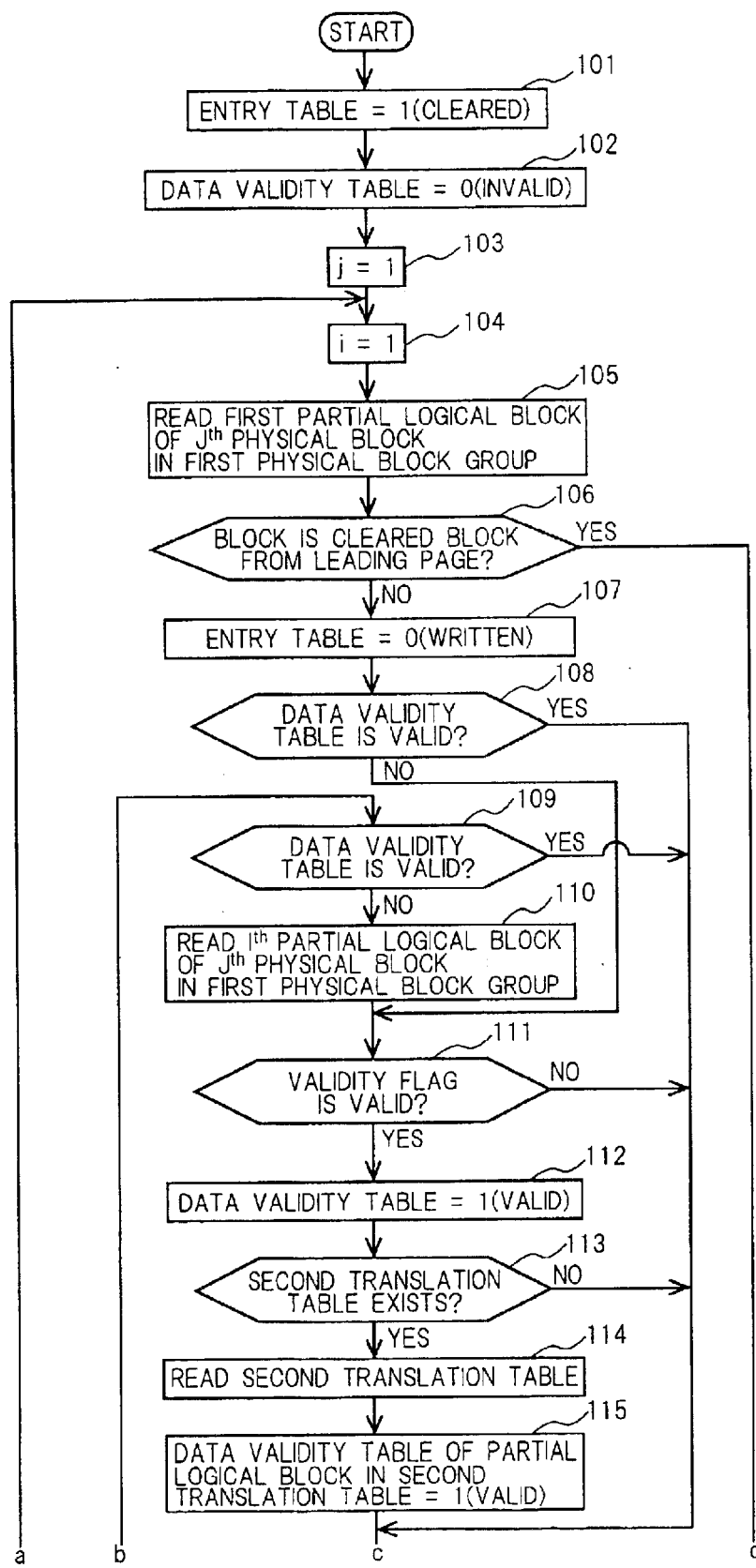
FIG. 1A is a flowchart part 1 of operations of a third table generation means and a fourth table generation means at initialization of a nonvolatile storage device of Embodiment 1 according to the present invention.
Figure 1B:
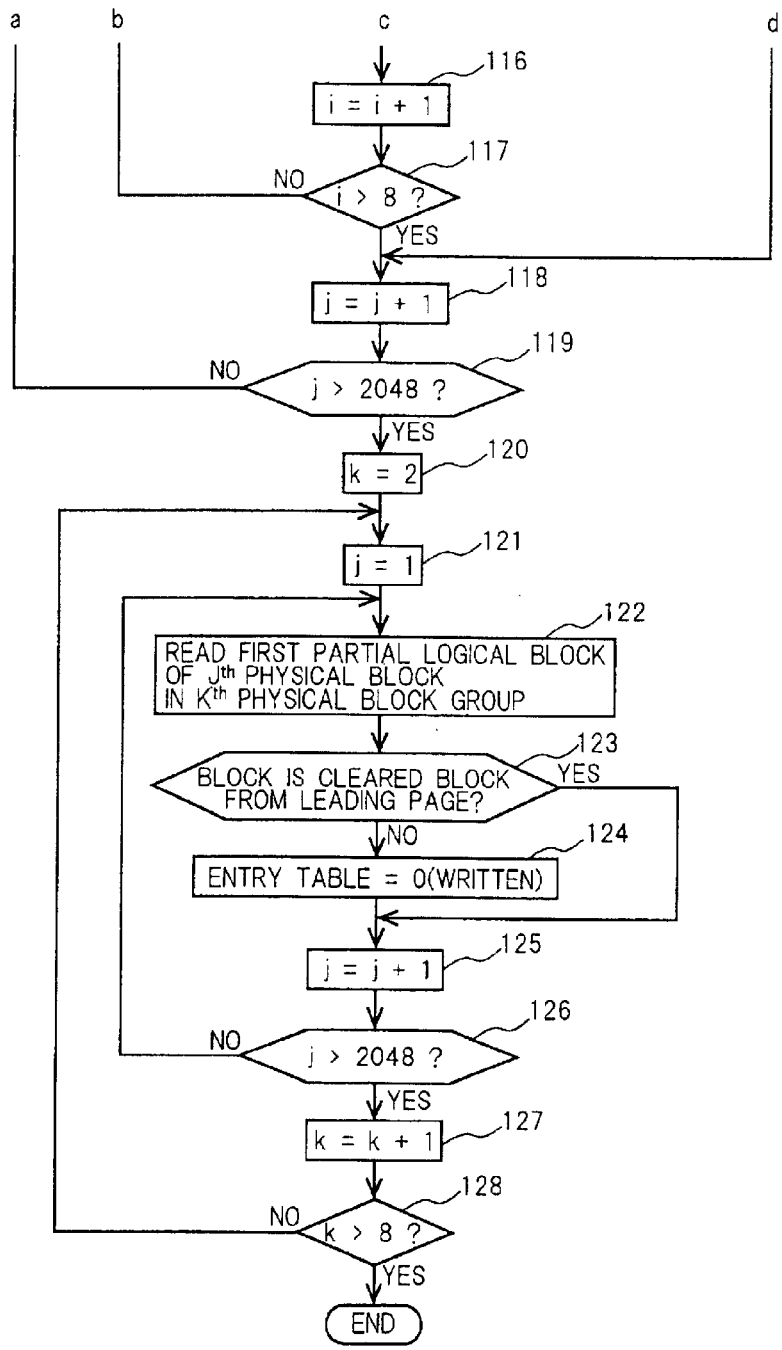
FIG. 1B is a flowchart part 2 of operations of the third table generation means and the fourth table generation means at initialization of the nonvolatile storage device of Embodiment 1 according to the present invention.

FIGS. 1A and 1B are flowcharts of operations of the third table generation means and the fourth table generation means at initialization of the nonvolatile storage device of Embodiment 1 according to the present invention. Part a of FIG. 1A, part b of FIG. 1A, part c of FIG. 1A and part d of FIG. 1A are connected to part a of FIG. 1B, part b of FIG. 1B, part c of FIG. 1B and part d of FIG. 1B, respectively.

In FIGS. 1A and 1B, at step 101, the third table generation means initializes all fields of the entry table by the default value 1 (cleared). At step 102, the fourth table generation means initializes all fields of the data validity table by the default value 0 (invalid). At step 103, the control part 3 initializes physical block number j in the physical block group by the default value 1. At step 104, the control part 3 initializes partial logical block number i in the physical block by the default value 1.

At step 105, the control part 3 reads out the first partial logical block of the $j^{th}$ physical block in the first physical block group. At step 106, in accordance with the first data of a leading page of the physical block read out, the control part 3 determines whether the physical block is a cleared one or not. In the case of the cleared physical block, the entry table has been already initialized with the default value 1 (cleared) at the step 101 and the data validity table has been already initialized with the default value 0 (invalid) at the step 102. Therefore, the control part 3 completes processing of the $j^{th}$ physical block without doing anything. In the case of the written physical block, the operation proceeds to step 107 and the third table generation means writes 0 (written) in the field of the physical block of the entry table.

At step 108, the control part 3 determines whether 1 (valid) has been already written in the data validity table or not. In the case where 1 (valid) has been written, the control part 3 completes processing the $i^{th}$ partial logical block. In the case where the default value 0 (invalid) still remains, the operation proceeds to step 111 and the control part 3 determines whether the validity flag in redundant area is valid or not. In the case where the validity flag is invalid, the data validity table has been already initialized with the default value 0 (invalid) at the step 102, and therefore the control part 3 completes processing of the $i^{th}$ partial logical block without doing anything. In the case where the validity flag is valid, the operation proceeds to step 112 and the fourth table generation means writes 1 (valid) in the field of the partial logical block of the data validity table.

At step 113, the control part 3 determines whether the partial logical block has the second translation table or not. In the case where it has no second translation table, the control part 3 completes processing of the $i^{th}$ partial logical block. In the case where it has the second translation table, the operation proceeds to step 114 and the control part 3 reads the second translation table. At step 115, the fourth table generation means writes 1 (valid) in the field of the partial logical block stated in the second translation table of the data validity table.

At step 116, the control part 3 adds 1 to the partial physical block number i in the physical block. At step 117, the control part 3 determines whether the partial logical block is a last one in the physical block or not, that is, i>8 or not. In the case where the partial logical block is not a last one, that is, i≦8, the operation returns to the step 109 and the control part 3 determines whether 1 (valid) has been already written in the data validity table or not. In the case where 1 (valid) has been written, the control part 3 completes processing the $i^{th}$ partial logical block. In the case where the default value 0 (invalid) still remains, the operation proceeds to step 110, and the control part 3 reads out the $i^{th}$ partial logical block of the $j^{th}$ physical block in the first physical block group and carries out processing at the steps 111 to 117 again. In the case where the partial logical block is a last one, that is, i>8 at the step 117, the control part 3 completes processing of the $j^{th}$ physical block and proceeds to processing of the next physical block.

At step 118, the control part 3 adds 1 to the physical block number j in the physical block group. At step 119, the control part 3 determines whether the physical block is a last one in the physical block group or not, that is, j>2048 or not. In the case where the physical block is not a last one, that is, j≦2048, the operation returns to the step 104 and the control part 3 performs processing of the next physical block. In the case where the physical block is a last one, that is, j>2048, the control part 3 completes processing of the first physical block group and proceeds to processing of the second physical block group.

At step 120, the control part 3 initializes physical block group number k by the default value 2. At step 121, the control part 3 initializes physical block number j in the physical block group by the default value 1.

At step 122, the control part 3 reads out the first partial logical block of the $j^{th}$ physical block in the $k^{th}$ physical block group. At step 123, in accordance with the first data of a leading page of the physical block read out, the control part 3 determines whether the physical block is a cleared one or not. In the case of the cleared physical block, the entry table has been already initialized with the default value 1 (cleared) at the step 101 and therefore the control part 3 completes processing of the $j^{th}$ physical block without doing anything. In the case of the written physical block, the operation proceeds to step 124 and the third table generation means writes 0 (written) in the field of the physical block of the entry table.

At step 125, the control part 3 adds 1 to the physical block number j in the physical block group. At step 126, the control part 3 determines whether the physical block is a last one in the physical block group or not, that is, j>2048 or not. In the case where the physical block is not a last one, that is, j≦2048, the operation returns to the step 122 and the control part 3 performs processing of the next physical block. In the case where the physical block is a last one, that is, j>2048, the control part 3 completes processing of the $k^{th}$ physical block group and proceeds to processing of the next physical block group.

At step 127, the control part 3 adds 1 to the physical block group number k. At step 128, the control part 3 determines whether the physical block group is a last one or not, that is, k>8 or not. In the case where the physical block group is not a last one, that is, k≦8, the operation returns to the step 121 and the control part 3 carries out processing of the next physical block group. In the case where the physical block group is a last one, that is, k>8, this flowchart ends.

In Embodiment 1, at the step 115, the fourth table generation means generates the data validity table by using the second translation table. At the steps 108 and 109, with respect to the partial logical block that the data validity table is generated at the step 115, the control part 3 decides not to read out data therefrom. Therefore, the number of partial logical block read out at the step 110 decreases. This enables the fourth table generation means to reduce time for generating the data validity table. That is, the nonvolatile storage device 1 can achieve shortening of initialization time.

When the second translation table is read at the step 114 and steps of reading out the second translation table from the second to eighth partial logical blocks (omitted in FIG. 1B), the first table generation means associates physical address with logical address of the partial logical block having the second translation table, and writes them in the first translation table.

When the nonvolatile storage device makes the nonvolatile storage medium store new data therein, the control part detects a cleared physical block from the entry table and writes the new data in it. The second table generation means generates the second translation table in the redundant area of the partial logical block in which the new data is written, associates physical address with logical address of the new data, and writes them in the second translation table.

In the case where the nonvolatile storage medium physically erases invalid data, the control part detects the physical block that all of eight partial logical blocks are invalid by the data validity table and physically erases the physical block.

<<Embodiment 2>>

A nonvolatile storage device of Embodiment 2 according to the present invention has the same configuration as the nonvolatile storage device of Embodiment 1 (FIG. 4). The nonvolatile storage device of Embodiment 2 is similar to the nonvolatile storage device of Embodiment 1 except for the following points.

Figure 2A:
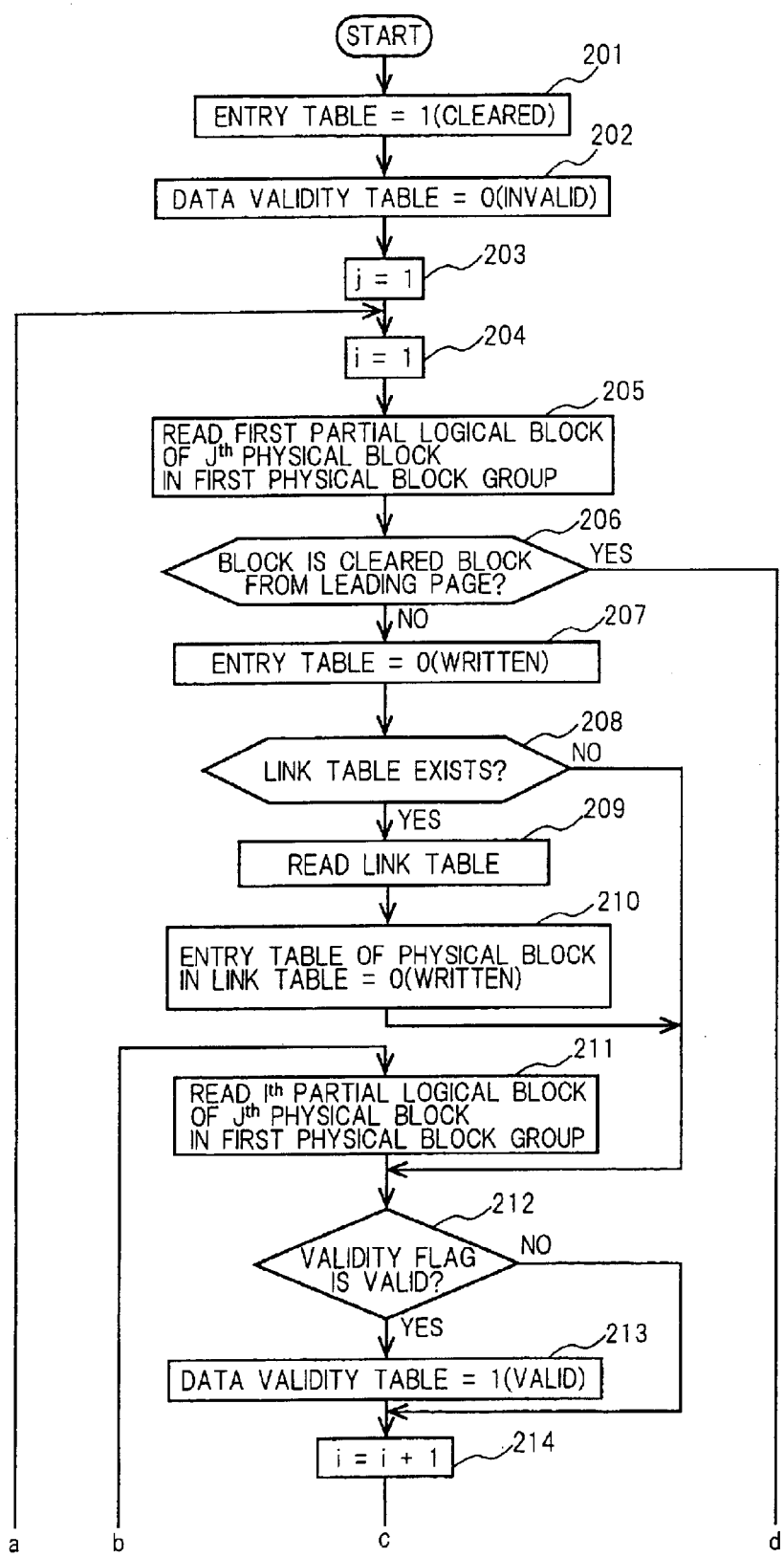
FIG. 2A is a flowchart part 1 of operations of the third table generation means and the fourth table generation means at initialization of a nonvolatile storage device of Embodiment 2 according to the present invention.
Figure 2B:
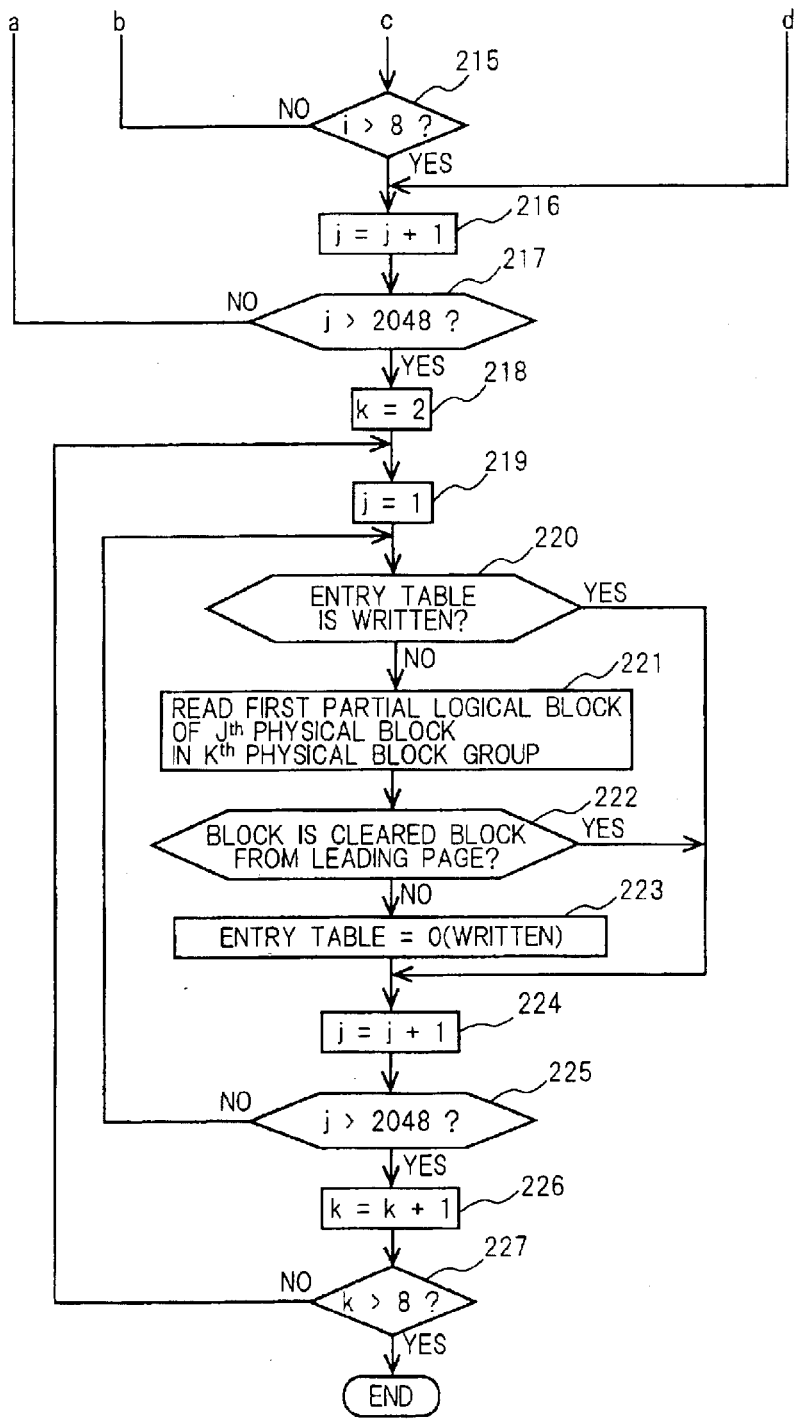
FIG. 2B is a flowchart part 2 of operations of the third table generation means and the fourth table generation means at initialization of the nonvolatile storage device of Embodiment 2 according to the present invention.

FIGS. 2A and 2B are flowcharts of operations of the third table generation means and the fourth table generation means at initialization of the nonvolatile storage device of Embodiment 2 according to the present invention. Part a of FIG. 2A, part b of FIG. 2A, part c of FIG. 2A and part d of FIG. 2A are connected to part a of FIG. 2B, part b of FIG. 2B, part c of FIG. 2B and part d of FIG. 2B, respectively.

In FIGS. 2A and 2B, at step 201, the third table generation means initializes all fields of the entry table by the default value 1 (cleared). At step 202, the fourth table generation means initializes all fields of the data validity table by the default value 0 (invalid). At step 203, the control part 3 initializes physical block number j in the physical block group by the default value 1. At step 204, the control part 3 initializes partial logical block number i in the physical block by the default value 1.

At step 205, the control part 3 reads out the first partial logical block of the $j^{th}$ physical block in the first physical block group. At step 206, in accordance with the first data of a leading page of the physical block read out, the control part 3 determines whether the physical block is a cleared one or not. In the case of the cleared physical block, the entry table has been already initialized with the default value 1 (cleared) at the step 201 and the data validity table has been already initialized with the default value 0 (invalid) at the step 202. Therefore, the control part 3 completes processing of the $j^{th}$ physical block without doing anything. In the case of the written physical block, the operation proceeds to step 207 and the third table generation means writes 0 (written) in the field of the physical block of the entry table.

At step 208, the control part 3 determines whether the physical block has a link table or not. In the case where it has no link table, the operation proceeds to step 212. In the case where it has a link table, the operation proceeds to step 209 and the control part 3 reads the link table. At step 210, the third table generation means writes 0 (written) in the field of the physical block including the partial logical block stated in the link table, in the entry table.

At step 212, the control part 3 determines whether the validity flag in redundant area is valid or not. In the case where the validity flag is invalid, the data validity table has been already initialized with the default value 0 (invalid) at the step 202, and therefore the control part 3 completes processing of the $i^{th}$ partial logical block without doing anything. In the case where the validity flag is valid, the operation proceeds to step 213 and the fourth table generation means writes 1 (valid) in the field of the partial logical block of the data validity table.

At step 214, the control part 3 adds 1 to the partial physical block number i in the physical block. At step 215, the control part 3 determines whether the partial physical block is a last one in the physical block or not, that is, i>8 or not. In the case where the partial logical block is not a last one, that is, i≦8, the operation returns to the step 211 and the control part 3 reads out the $i^{th}$ partial logical block of the $j^{th}$ physical block in the first physical block group and carries out processing at the steps 212 to 215 again. In the case where the partial logical block is a last one, that is, i>8 at the step 215, the control part 3 completes processing of the $j^{th}$ physical block and proceeds to processing of the next physical block.

At step 216, the control part 3 adds 1 to the physical block number j in the physical block group. At step 217, the control part 3 determines whether the physical block is a last one in the physical block group or not, that is, j>2048 or not. In the case where the physical block is not a last one, that is, j≦2048, the operation returns to the step 204 and the control part 3 performs processing of the next physical block. In the case where the physical block is a last one, that is, j>2048, the control part 3 completes processing of the first physical block group and proceeds to processing of the second physical block group.

At step 218, the control part 3 initializes physical block group number k by the default value 2. At step 219, the control part 3 initializes physical block number j in the physical block group by the default value 1.

At step 220, the control part 3 determines whether 0 (written) has been already written in the entry table or not. In the case where 0 (written) has been written, the control part 3 completes processing of the $j^{th}$ physical block. In the case where the default value 1 (cleared) still remains, the control part 3 reads out the first partial logical block of the $j^{th}$ physical block in the $k^{th}$ physical block group at step 221. At step 222, in accordance with the first data of a leading page of the physical block read out, the control part 3 determines whether the physical block is a cleared one or not. In the case of the cleared physical block, the entry table has been already initialized with the default value 1 (cleared) at the step 201 and therefore the control part 3 completes the processing of the $j^{th}$ physical block without doing anything. In the case of the written physical block, the operation proceeds to step 223 and the third table generation means writes 0 (written) in the field of the physical block of the entry table.

At step 224, the control part 3 adds 1 to the physical block number j in the physical block group. At step 225, the control part 3 determines whether the physical block is a last one in the physical block group or not, that is, j>2048 or not. In the case where the physical block is not a last one, that is, j≦2048, the operation returns to the step 220 and the control part 3 performs processing of the next physical block. In the case where the physical block is a last one, that is, j>2048, the control part 3 completes processing of the $k^{th}$ physical block group and proceeds to processing of the next physical block group.

At step 226, the control part 3 adds 1 to the physical block group number k. At step 227, the control part 3 determines whether the physical block group is a last one or not, that is, k>8 or not. In the case where the physical block group is not a last one, that is, k≦8, the operation returns to the step 219 and the control part 3 carries out processing of the next physical block group. In the case where the physical block group is a last one, that is, k>8, this flowchart ends.

In addition, the link table may exist in any block group of the first to eighth physical block groups and similar effects can be achieved.

In Embodiment 2, at the step 210, the third table generation means generates the entry table by using the link table. At the step 220, with respect to the partial logical block that the entry table is generated at the step 210, the control part 3 decides not to read out data therefrom. Therefore, the number of partial logical block read out at the step 221 decreases. This enables the third table generation means to reduce time for generating the entry table. That is, similarly in Embodiment 1, the nonvolatile storage device 1 can achieve shortening of initialization time.

<<Embodiment 3>>

A nonvolatile storage device of Embodiment 3 according to the present invention has the same configuration as the nonvolatile storage device of Embodiment 1 (FIG. 4). The nonvolatile storage device of Embodiment 3 is similar to the nonvolatile storage device of Embodiment 1 except for the following points.

Figure 11:
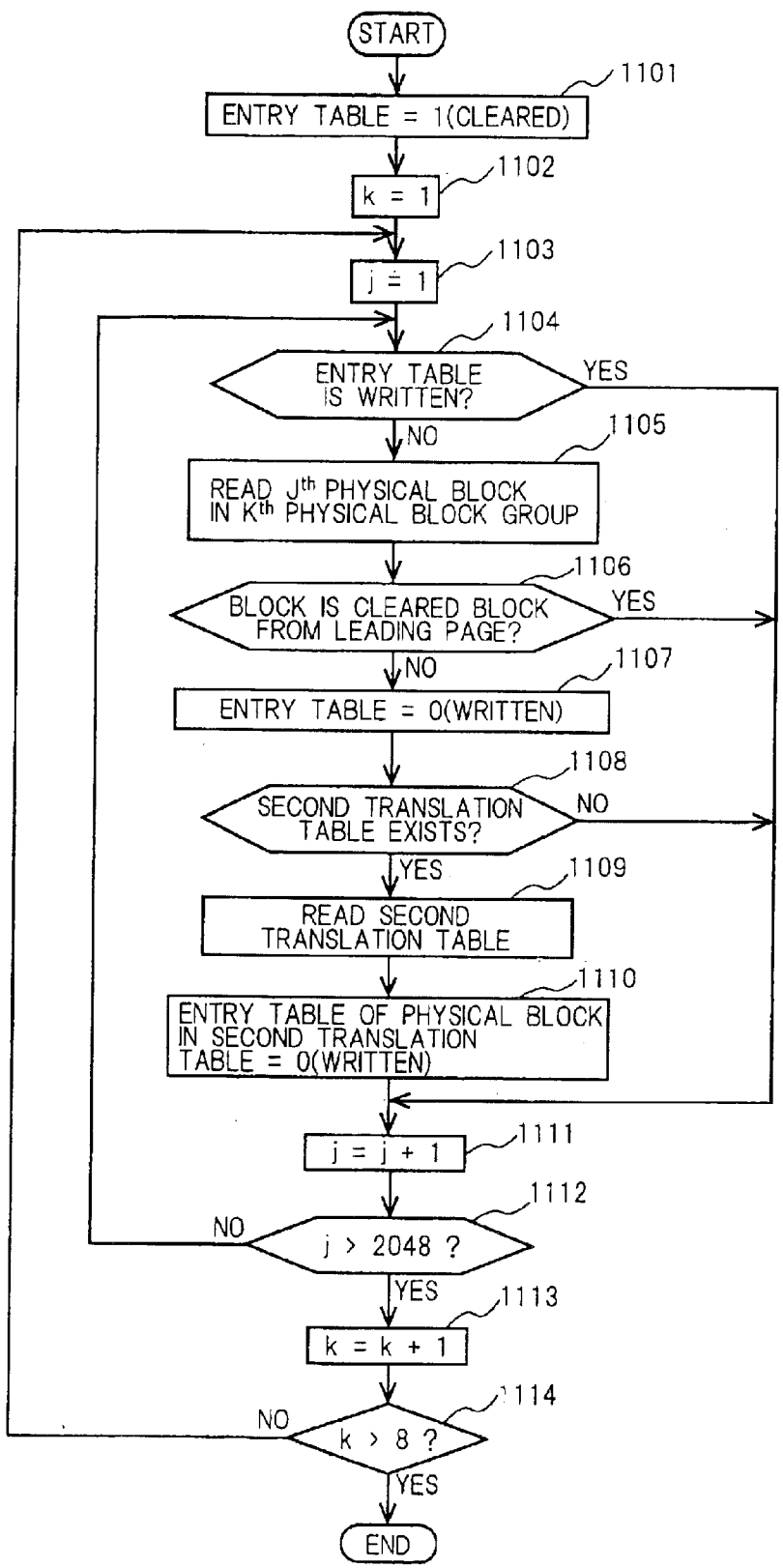
FIG. 11 is a flowchart of operations of the third table generation means at initialization of a nonvolatile storage device of Embodiment 3 according to the present invention.

FIG. 11 is a flowchart of operations of the third table generation means at initialization of the nonvolatile storage device of Embodiment 3 according to the present invention.

In FIG. 11, at step 1101, the third table generation means initializes all fields of the entry table by the default value 1 (cleared). At step 1102, the control part 3 initializes physical block group number k by the default value 1. At step 1103, the control part 3 initializes physical block number j in the physical block group by the default value 1.

At step 1104, the control part 3 determines whether 0 (written) has been already written in the entry table or not. In the case where 0 (written) has been written, the control part 3 completes processing of the $j^{th}$ physical block. In the case where the default value 1 (cleared) still remains, the control part 3 reads out the first partial logical block of the $j^{th}$ physical block in the $k^{th}$ physical block group at step 1105. At step 1106, in accordance with the first data of a leading page of the physical block read out, the control part 3 determines whether the physical block is a cleared one or not. In the case of the cleared physical block, the entry table has been already initialized with the default value 1 (cleared) at the step 1101 and therefore the control part 3 completes the processing of the $j^{th}$ physical block without doing anything. In the case of the written physical block, the operation proceeds to step 1107 and the third table generation means writes 0 (written) in the field of the physical block of the entry table.

At step 1108, the control part 3 determines whether the partial logical block has the second translation table or not. In the case where it has no second translation table, the control part 3 completes processing of the $j^{th}$ physical block. In the case where it has the second translation table, the operation proceeds to step 1109 and the control part 3 reads the second translation table. At step 1110, the third table generation means writes 0 (written) in the field of the physical block including the partial logical block stated in the second translation table, in the entry table.

At step 1111, the control part 3 adds 1 to the physical block number j in the physical block group. At step 1112, the control part 3 determines whether the physical block is a last one in the physical block group or not, that is, j>2048 or not. In the case where the physical block is not a last one, that is, j≦2048, the operation returns to the step 1104 and the control part 3 performs processing of the next physical block. In the case where the physical block is a last one, that is, j>2048, the control part 3 completes processing of the $k^{th}$ physical block group and proceeds to processing of the next physical block group.

At step 1113, the control part 3 adds 1 to the physical block group number k. At step 1114, the control part 3 determines whether the physical block group is a last one or not, that is, i>8 or not. In the case where the physical block group is not a last one, that is, i≦8, the operation returns to the step 1103 and the control part 3 performs processing the next physical block group. In the case where the physical block group is a last one, that is, i>8, this flowchart ends.

In Embodiment 3, at the step 1110, the third table generation means generates the entry table by using the second translation table. At the step 1104, with respect to the physical block that the entry table is generated at the step 1110, the control part 3 decides not to read out data therefrom. Therefore, the number of physical block read out at the step 1105 decreases. This enables the third table generation means to reduce time for generating the entry table. That is, similarly in Embodiment 1, the nonvolatile storage device 1 can achieve shortening of initialization time.

<<Embodiment 4>>

Figure 3:
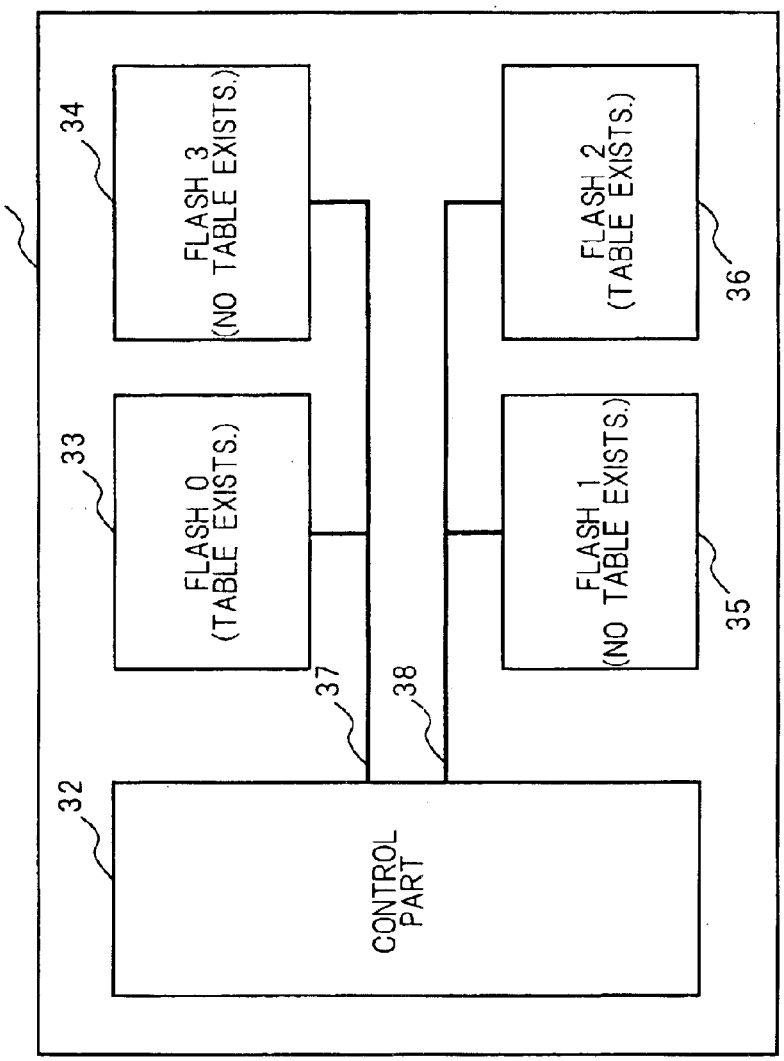
FIG. 3 is a configuration view of a nonvolatile storage device of Embodiment 4 according to the present invention.

FIG. 3 is a configuration view of a nonvolatile storage device of Embodiment 4 according to the present invention.

In FIG. 3, the nonvolatile storage device 31 has a control part 32 and a plurality of flash memories (nonvolatile storage mediums) 33 to 36. The control part 32 is connected to two bus lines 37 and 38, each bus line being connected to as many (two) flash memories. It is constructed so that the flash memories connected to one bus line have the same number of second translation tables and link tables as those connected to other bus line as far as possible.

When power is applied, the control part 32 reads the validity flag, the first data, the link table and the second translation table that are stored in each physical block within the flash memories and generates the first translation table 4, the entry table 6 and the data validity table 5 (initialization processing). It is constructed so that the flash memories connected to one bus line have approximately the same number of second translation tables and link tables as those connected to other bus line, so that the nonvolatile storage device 1 can read about equal amount of data through each bus line at initialization (transfer load through each bus line can be equalized). More data transfer amount through a certain bus-line requires a longer time to transfer data through the bus line, thereby leading to an increase in total time for initialization processing. As in Embodiment 4, by equalizing data transfer amount through each bus line, the nonvolatile storage device 1 can achieve shortening of total time for initialization processing.

By reducing the number of physical block or partial logical block needed to be read and shortening initialization time of the nonvolatile storage device, the nonvolatile storage device can respond to an external request in a short time after power is applied. Therefore, products (for example, cellular phone) having a nonvolatile storage device (for example, IC cards such as SD card) can fulfill its function in a short time after power is applied.

Although the invention has been described in its preferred form with a certain degree of particularity, it is understood that the present disclosure of the preferred form may be changed in the details of construction and the combination and arrangement of parts may be resorted to without departing from the spirit and the scope of the invention as hereinafter claimed

INDUSTRIAL APPLICABILITY

The nonvolatile storage device and control method thereof according to the present invention are useful as the nonvolatile storage device which is capable of connecting to various apparatus such as portable device and control method thereof.

What is claimed is:

1. A nonvolatile storage device comprising:

a plurality of physical blocks;

a first table generation means for generating a first translation table to obtain physical addresses from logical addresses;

a second table generation means for generating a second translation table to obtain physical addresses from logical addresses; and a third table generation means for generating a third table which indicates whether each of said physical blocks has been cleared or not, wherein said physical block has a data area which stores data therein and first data which indicates whether said physical block has been cleared or not, and said physical block designated by the physical address of said first translation table further has said second translation table, and said third table generation means reads out said first data and said second translation table from said physical block, decides a value of said third table of said physical block in accordance with said first data, determines that a value of said third table of said physical block corresponding to the physical address contained in said second translation table is the value indicating that said physical block has not been cleared, and does not read said first data with respect to said physical block which is contained in said second translation table and from which said first data has not been read out.

2. A nonvolatile storage device in accordance with claim 1, wherein said nonvolatile storage device comprises a plurality of bus lines and a plurality of nonvolatile storage elements which have a plurality of said physical blocks and are connected to said bus lines, and the number of said second translation table which is written in said nonvolatile storage elements connected to said bus lines is substantially same for each bus line.

3. A nonvolatile storage device comprising:

a plurality of physical blocks;

a write means for dividing input data and writing the divided data in a plurality of said physical blocks or divided areas of said physical blocks;

a link table generation means for generating a link table which is link information of a plurality of said physical blocks or said areas in which the divided input data is written respectively; and a third table generation means for generating a third table which indicates whether each of said physical blocks has been cleared or not, wherein said physical block has a data area which stores data therein and a first data which indicates whether said physical block has been cleared or not, and at least one said physical block or said area among a plurality of said physical blocks or said areas in which divided input data is written respectively further has said link table, and said third table generation means reads out said first data and said link table from said physical block or said area, decides a value of said third table of said physical block in accordance with said first data, determines that a value of said third table of said physical block corresponding to the physical address contained in said link table is the value indicating that said physical block has not been cleared, and does not read said first data with respect to said physical block which is contained in said link table and from which said first data has not been read out.

4. A nonvolatile storage device in accordance with claim 3, wherein said nonvolatile storage device comprises a plurality of bus lines and a plurality of nonvolatile storage elements which have a plurality of said physical blocks and are connected to said bus lines, and the number of said link table which is written in said nonvolatile storage elements connected to said bus lines is substantially same for each bus line.

5. A nonvolatile storage device comprising:
a plurality of physical blocks;
a first table generation means for generating a first translation table to obtain physical addresses from logical addresses;
a second table generation means for generating a second translation table to obtain physical addresses from logical addresses; and
a fourth table generation means for generating a fourth table which indicates whether valid data is written in each of said physical blocks or divided areas of said physical blocks or not,
wherein said physical block or said area has a data area which stores data therein, and
said physical block or said area designated by the physical address of said first translation table further has said second translation table and a second flag which indicates whether said second translation table is valid or not, and
said fourth table generation means reads out said second flag and said second, translation table from said physical block or said area, decides a value of said fourth table of said physical block or said area in accordance with said second flag, determines that a value of said fourth table of said physical block or said area corresponding to the physical address contained in said second translation table is the value indicating that valid data is written, and does not read said second flag with respect to said physical block or said area which is contained in said second translation table and from which said second flag has not been read out.

6. A control method of a nonvolatile storage device comprising:
a plurality of physical blocks;
a first table generation means for generating a first translation table to obtain physical addresses from logical addresses;
a second table generation means for generating a second translation table to obtain physical addresses from logical addresses; and
a third table generation means for generating a third table which indicates whether each of said physical blocks has been cleared or not,
wherein said physical block has a data area which stores data therein and first data which indicates whether said physical block has been cleared or not, and
said physical block designated by the physical address of said first translation table further has said second translation table, and the method having:
a first decision step at which said third table generation means reads out said first data from said physical block and decides a value of said third table of said physical block in accordance with said first data; and
a second decision step at which said third table generation means reads out said second translation table from said physical block and determines that a value of said third table of said physical block corresponding to the physical address contained in said second translation table is the value indicating that said physical block has not been cleared,
wherein said third table generation means does not perform said first decision step with respect to said physical block which is contained in said second translation table and from which said first data has not been read out.

7. A control method of a nonvolatile storage device comprising:
a plurality of physical blocks;
a write means for dividing input data and writing the divided data in a plurality of said physical blocks or divided areas of said physical blocks;
a link table generation means for generating a link table which is link information of a plurality of said physical blocks and said areas in which the divided input data is written respectively; and
a third table generation means for generating a third table which indicates whether each of said physical blocks has been cleared or not,
wherein said physical block has a data area which stores data therein and first data which indicates whether said physical block has been cleared or not, and
at least one said physical block or said area among a plurality of said physical blocks or said areas in which divided input data is written respectively further has said link table, and the method having:
a first decision step at which said third table generation means reads out said first data from said physical block or said area and decides a value of said third table of said physical block in accordance with said first data; and
a second decision step at which said third table generation means reads out said link table from said physical block or said area and determines that a value of said third table of said physical block corresponding to the physical address contained in said link table is the value indicating that said physical block has not been cleared,
wherein said third table generation means does not perform said first decision step with respect to said physical block or said area which is contained in said link table and from which said first data has not been read out.

8. A control method of a nonvolatile storage device comprising:
a plurality of physical blocks;
a first table generation means for generating a first translation table to obtain physical addresses from logical addresses;
a second table generation means for generating a second translation table to obtain physical addresses from logical addresses; and
a fourth table generation means for generating a fourth table which indicates whether valid data is written in each of said physical blocks or divided areas of said physical blocks or not,
wherein said physical block or said area has a data area which stores data therein, and
said physical block or said area designated by the physical address of said first translation table further has said second translation table and a second flag which indicates whether said second translation table is valid or not, and the method having:
a first decision step at which said fourth table generation means reads out said second flag from said physical block or said area, decides a value of said fourth table of said physical block or said area in accordance with said second flag; and
a second decision step at which said fourth table generation means reads out said second translation table from said physical block or said area and determines that a value of said fourth table of said physical block or said area corresponding to the physical address contained in said second translation table is the value indicating that valid data is written, wherein said fourth table generation means does not perform said first decision step with respect to said physical block or said area which is contained in said second translation table and from which said second flag has not been read out.

* * * * *